United States Patent
Sheu et al.

(10) Patent No.: US 7,792,067 B2
(45) Date of Patent: Sep. 7, 2010

(54) WIRELESS NETWORK SCHEDULING CONTROL SYSTEM AND METHOD THEREOF AND COMPUTER READABLE RECORDING MEDIA

(75) Inventors: Shiann-Tsong Sheu, Taipei (TW); Yen-Chieh Cheng, Taipei (TW); Hua-Chiang Yin, Gueishan Township, Taoyuan County (TW); Frank Chee-Da Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 622 days.

(21) Appl. No.: 11/802,849

(22) Filed: May 25, 2007

(65) Prior Publication Data

US 2008/0151802 A1 Jun. 26, 2008

(30) Foreign Application Priority Data

Dec. 25, 2006 (TW) .............................. 95148833 A

(51) Int. Cl.
*G08C 17/00* (2006.01)

(52) U.S. Cl. .................. 370/311; 370/350; 370/373; 370/384; 455/13.4; 455/522; 455/574; 455/343.3; 455/343.4

(58) Field of Classification Search .......... 370/311, 370/350, 373, 384; 455/450–453, 13.4, 515, 455/522, 574, 343.1–343.6; 340/7.32–7.38
See application file for complete search history.

(56) References Cited

U.S. PATENT DOCUMENTS

| 6,052,779 | A  | * | 4/2000  | Jackson et al. ............... 713/2 |
| 6,243,579 | B1 | * | 6/2001  | Kari .......................... 455/426.1 |
| 7,542,437 | B1 | * | 6/2009  | Redi et al. .................. 370/311 |
| 2006/0209671 | A1 | * | 9/2006  | Khan et al. ................. 370/208 |
| 2007/0249347 | A1 | * | 10/2007 | Saifullah et al. ........... 455/436 |

OTHER PUBLICATIONS

Air Interface for Fixed and Mobile Broadband Wileless Access Systems, 802.16j-06/026r2, Feb. 9, 2007.

* cited by examiner

*Primary Examiner*—Kent Chang
*Assistant Examiner*—San Htun
(74) *Attorney, Agent, or Firm*—Rabin & Berdo, P.C.

(57) ABSTRACT

A wireless network scheduling control system and a method therefor are provided, which includes a first receiving/transmitting node, one or a plurality of second receiving/transmitting nodes, and an end receiving/transmitting node. When data is transmitted from the first receiving/transmitting node to the end receiving/transmitting node via the second receiving/transmitting node, a type of the transmitted data for being connected is determined. If a transmission sequence can be registered and reset, the end receiving/transmitting node enters a sleeping mode through a control signal, and the second receiving/transmitting node registers and resets the transmission sequence; otherwise, the transmission is performed according to a plan of an MAP. A technology of registering and reorganizing the data in a frame structure that is transmitted is utilized, such that the data relevant to the end receiving/transmitting node is received and transmitted as collectively as possible.

27 Claims, 2 Drawing Sheets

WIRELESS NETWORK SCHEDULING CONTROL SYSTEM AND METHOD THEREOF AND COMPUTER READABLE RECORDING MEDIA

CROSS-REFERENCE TO RELATED APPLICATIONS

This non-provisional application claims priority under 35 U.S.C. §119(a) on Patent Application No(s). 095148833 filed in Taiwan, R.O.C. on Dec. 25, 2006, the entire contents of which are hereby incorporated by reference.

BACKGROUND OF THE INVENTION

1. Field of the Invention

The present invention relates to a scheduling control system and a method thereof, and more particularly to a wireless network scheduling control system and a method thereof, which are capable of achieving power saving with data registration and reorganization technology in a multipoint wireless transmission network, and especially suitable for a WiMAX network.

2. Related Art

With the maturity of wireless technologies, it is not limited to utilizing physical lines when constructing a network. For example, Wireless Local Area Network (WLAN) is a local area network constructed according to IEEE 802.11 communication protocol and specifications complied by Institute of Electrical and Electronic Engineer (IEEE). IEEE 802.11 is a protocol on the basis of radio technology. A WLAN constructed according to this protocol is not limited to using physical lines when forming the network, but instead, computers or communication devices can form and use the network, as long as they fall in the scope covered by radio signals. Similar wireless network includes Wireless Personal Area Network (WPAN) constructed with Bluetooth technology, Sensor Network formed by sensors, and Wireless Metropolitan Area Network (WMAN) constructed according to IEEE 802.16 protocol and specifications (or Worldwide Interoperability for Microwave Access, WiMAX). These networks constructed through wireless technologies all have the advantages that no physical lines are required; the network constructing cost is reduced, and it is not limited by the positions of physical lines.

Among others, WiMAX, a new wireless technology, has the advantages of a long transmission distance, a high transmission speed, and a low network construction cost. WiMAX has the working frequency of 2 GHz to 11 GHz, the transmission distance of up to 50 km, and supports the network structure of Point to Point (P2P) or Point to Multi-Point (PMP). Moreover, WiMAX can select to operate at the frequency between 2 GHz and 11 GHz according to the requirements on service levels. As for the PMP operating mode of WiMAX, data is directly transmitted between a node playing the role of a base station (BS) and a subscriber station (SS) or a mobile station (MS) playing the role of an end receiving/transmitting node. In order to perform the data transmission, connections must be established before the data transmission happens. Each connection has a connection ID (CID). The same CID is corresponding to the same service flow, and the same service flow is corresponding to the same quality of service (QoS) parameters. Under Mobile Multi-hop Relay (WiMAX MMR) network architecture, besides the BS and SS/MS, one or more relay nodes playing the role of relay stations can be used to expand the transmission scope of the BS, or enhance the overall transmission rate. According to the description on relay specifications in IEEE 802.16j, under a time division duplex (TDD) mode, a frame can be divided into a plurality of zones according to the transmission time. These zones have different functions, for example, a zone that transmits data to and receives data from an end receiving/transmitting node is referred as an access zone, and a zone that transmits data to and receives data from a relay node is referred as a relay zone. Moreover, the zones can also be classified into uplink zone (UL-Zones) and downlink zones (DL-Zones). Herein, the downlink refers to the transmission direction from BS to SS/MS, including the transmission from BS to RS or SS/MS, or the transmission from RS to SS/MS, or the transmission from RS downwards to RS; the uplink refers to the transmission direction from SS/MS to BS, including the transmission from SS/MS to BS, or the transmission from SS/MS to RS, or the transmission from RS upwards to RS or BS. Each of the zones includes a plurality of data bursts. In a downlink transmission, a pack of MAC Protocol Data Units (MAC PDUs) is included in the data bursts, which is generally transmitted to a certain SS/MS. However, under the circumstances of multicast or broadcast, the MAC PDUs may be sent to a number of SS/MS. If the MAC PDUs must be sent to a number of SS/MS, CIDs in headers (e.g., generic MAC header, GMH) of the pack of MAC PDUs have to be the same. In an uplink transmission, a pack of MAC PUDs in the same data burst is from the same SS/MS. As for uplink data, the SS/MS or RS will combine the transmitted data into one or more data bursts, and request BS or RS to arrange a period for the SS/MS or RS to transmit the bursts in the schedule. As for downlink data, the BS or RS will also combine the transmitted data into one or more data bursts, allocate a period to transmit the bursts in the schedule. As described above, the data is transmitted via frames in the MAC. Before the data is received and transmitted, the allocated schedule will be prepared in an MAP of a frame, and the MAP will be broadcasted when the frame starts. The MAPs are classified into uplink MAPs (UL-MAPs) and downlink MAPs (DL-MAPs). All the devices in the network (e.g., BS, RS, and SS/MS) will receive the data with appropriate modulation and codes at an appropriate start time point according to planned instructions in the DL-MAPs, and will transmit the data with appropriate modulation and codes at an appropriate start time point according to planned instructions in the UL-MAPs. In other words, the MAPs specify the sequence, start time, and duration for the data transmission of BS, RS, and SS/MS.

Generally, if an end receiving/transmitting node in a wireless network is a mobile device, such as an MS of WiMAX or an MS of WLAN (e.g., a notebook, PC, or PDA), the power is often supplied by a secondary battery. Once the power of the battery is run out, the MS cannot perform the data transmission. In a multiple-access wireless network in which the data transmission and the scheduling control are separated, a transmitted frame generally includes data of a number of nodes at the same time. As for a specific end receiving/transmitting node, if only a short period of transmission duration among the whole transmission duration of the frame is planned for the end receiving/transmitting node to receive and transmit the data in a frame according to the scheduling plan, during the transmission of this frame, the time in which no data is transmitted for the end receiving/transmitting node is a waste of power from the perspective of said end node. To an end receiving/transmitting node, the power saving mechanism is generally realized via the node entering a sleeping mode. For WiMAX, instead of transmitting data in a competitive mode as in WLAN, the network characteristic is a multiple-access wireless network in which the data transmission and the scheduling control are separated from each other.

In WiMAX, the end receiving/transmitting node MS is instructed to enter the sleeping mode at an appropriate time through a control message by BS, and the minimum unit for entering the sleeping mode each time is one frame. In the WiMAX network, if the control scheduling DL-MAP or UL-MAP of a certain frame plans that the MS needs to participate in data receiving or transmission in a specific frame, the MS cannot enter the sleeping mode to save the power during the transmission of this period. On the contrary, if the control scheduling DL-MAP or UL-MAP plans that the MS does not need to participate in data receiving or transmission in a specific frame, the MS can enter the sleeping mode to save the power during the transmission of this frame. Therefore, if the frame structure is well planned to increase the opportunity that the MS enters the sleeping mode, the MS will save the precious power. For example, FIG. 1 is a schematic view of the frame structure of WiMAX Mobile Multi-hop Relay (WiMAX MMR). Referring to FIG. 1, it is assumed that the network includes a BS, an RS, and three MSs (MS1 to 3). A preamble 110 of a frame 100 is used for detecting devices in the WiMAX network (BS, RS, and MS) and performing time synchronization, and the like. A MAP 120 includes a UL-MAP and a DL-MAP, for planning transmission schedules for devices participating in the data transmission. The rest part of the frame 100 excluding the preamble 110 and the MAP 120 is further divided into a zone 130 and a zone 140. The zone 130 includes three downlink data burst sets 131 to 133 (i.e., the sets of data bursts), and the zone 140 includes uplink data burst sets. It is assumed that in the DL-zone 130, the data burst set 131 is transmitted from BS to RS, the data burst set 132 is transmitted from RS to MS1, and the data burst set 133 is transmitted from RS to MS2, and the zone 140 does not include any uplink scheduling plan of MS1, MS2, and MS3. In this example, only MS3 can enter the sleeping mode as it does not participate in the uplink and downlink transmission, while MS1 and MS2 cannot enter the sleeping mode. Though MS1 and MS2 do not participate in the transmission during the uplink of the frame 140, MS1 and MS2 still have to remain in the active mode that consumes a high power, and cannot enter the sleeping mode, owing to the aforementioned power saving limit (i.e., the minimum unit for entering the sleeping mode each time is one frame). In other words, during the transmission of this frame, which includes a number of data burst sets, even if only a small part of the data burst sets are related to MS1 or MS2 according to the MAP planning, MS1 and MS2 cannot enter the sleeping mode during the whole transmission period of this frame.

Currently, the power saving mechanism exercised in WiMAX mainly involves enabling an MS to enter the power saving mode through coordination between its associated BS and the MS. In a WiMAX MMR network, data transmission between BS and MS can be relayed by one or more intermediate transmission nodes, RS(s). The present invention will provide a mechanism that registers data at intermediate transmission nodes RS and reorganizes data in a transmitted frame structure by re-planning MAP, such that a specific end receiving/transmitting node MS can receive and send relevant data as collectively as possible, so as to increase the opportunities for the MS to enter sleep mode to achieve the objective of saving power and prolonging the operation time.

SUMMARY OF THE INVENTION

In view of the above problems, the present invention is directed to a wireless network scheduling control system and a method thereof, which performs scheduling control on data transmission sequence for the wireless network, and reorganizes data to transmit within a transmission frame according to the above adjusted rescheduling, such that one or more end receiving/transmitting nodes can reduce idle time while in active mode, and thus can stay more time in sleeping mode, so as to save power consumption, and mitigate the problem of high power consumption for mobile stations in the prior art.

In order to achieve the aforementioned objects, the present invention is realized in two aspects of system and method. The wireless network scheduling control system disclosed in the present invention includes a first receiving/transmitting node, a second receiving/transmitting node, and at least one end receiving/transmitting node. The first receiving/transmitting node generates an MAP in a frame after synchronization, and it is responsible for transmitting a first data; the second receiving/transmitting node receives the frame from the first node after the synchronization, selectively follows the MAP in the frame or independently generates another MAP, and it is responsible for receiving the first data and relay a second data; and the at least one end receiving/transmitting node receives the MAP from the second receiving/transmitting node after the synchronization, receives the second data and/or transmits a third data to the second receiving/transmitting node, which relays a fourth data to the first receiving/transmitting node.

When the data relayed by the second receiving/transmitting node does not satisfy a condition suitable for registration and reorganization, the second data is transmitted according to a time planned by the MAP; when the data relayed by the second receiving/transmitting node satisfies a condition for registration and reorganization, the first receiving/transmitting node or the second receiving/transmitting node transmits a control message to control the end receiving/transmitting nodes that are to receive the relayed data, such that a part of or all of the end receiving/transmitting nodes enter a sleeping mode. Then, the second receiving/transmitting node registers the second data, and adjusts data transmission sequence for the MAP, such that when the second data accumulates to exceed a critical value, the control message is transmitted to all of or a part of the end receiving/transmitting nodes, so as to notify the end receiving/transmitting nodes to enter an active mode to receive the second data targeting for them and/or to start transmitting the third data.

The wireless network scheduling control method disclosed in the present invention includes the following steps. Firstly, a first receiving/transmitting node, a second receiving/transmitting node, and at least one end receiving/transmitting node enter a default mode after synchronization; next, the first receiving/transmitting node or the second receiving/transmitting node generates an MAP; then, when data relayed by the second receiving/transmitting node does not satisfy a condition suitable for registration and reorganization, the second receiving/transmitting node receives the first data transmitted by the first receiving/transmitting node, and relays a second data to the end receiving/transmitting nodes according to the MAP; when the data relayed by the second receiving/transmitting node satisfies the condition suitable for registration and reorganization, the first receiving/transmitting node or the second receiving/transmitting node transmits a control signal to instruct a part of or all of the end receiving/transmitting nodes that are to receive the relayed data to enter a sleeping mode; the second receiving/transmitting node registers the second data and adjusts a data transmission sequence for the MAP; and then, when the second data accumulates to exceed or equal to a critical value, the second receiving/transmitting node notifies all of or a part of the end receiving/transmitting nodes to enter an active mode with a control message, so as to receive the registered second data and/or to start transmitting the third data; finally, the second receiving/transmitting node relays a fourth data to the first receiving/transmitting node after receiving the third data.

The above wireless network scheduling control method can also be executed in a form of computer program code recorded in computer readable recording media.

Different from the conventional art that the end receiving/transmitting nodes have to remain in the active state during transmission period of various frames, each of which contains a small portion of its data, the present invention uses a second receiving/transmitting node (or a plurality of third receiving/transmitting nodes), and utilizes the technology of registering data in buffer and the technology of data reorganization within the frame. Not until the data targeting the end receiving/transmitting nodes accumulate to a certain amount at the second receiving/transmitting node do the data be sent to the end receiving/transmitting nodes all at once. During the period of data accumulation, the end receiving/transmitting nodes can enter the sleeping mode when they do not participate in the data receiving/transmission, so as to save the power, and further to prolong the operation time of the end receiving/transmitting nodes. The present invention will be especially advantageous in terms of end node power saving in the occasions of receiving non-continuously transmitted data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make the aforementioned and other objectives, features, and advantages of the present invention be more comprehensible, embodiments accompanied with figures are described in detail below.

Figure 1:
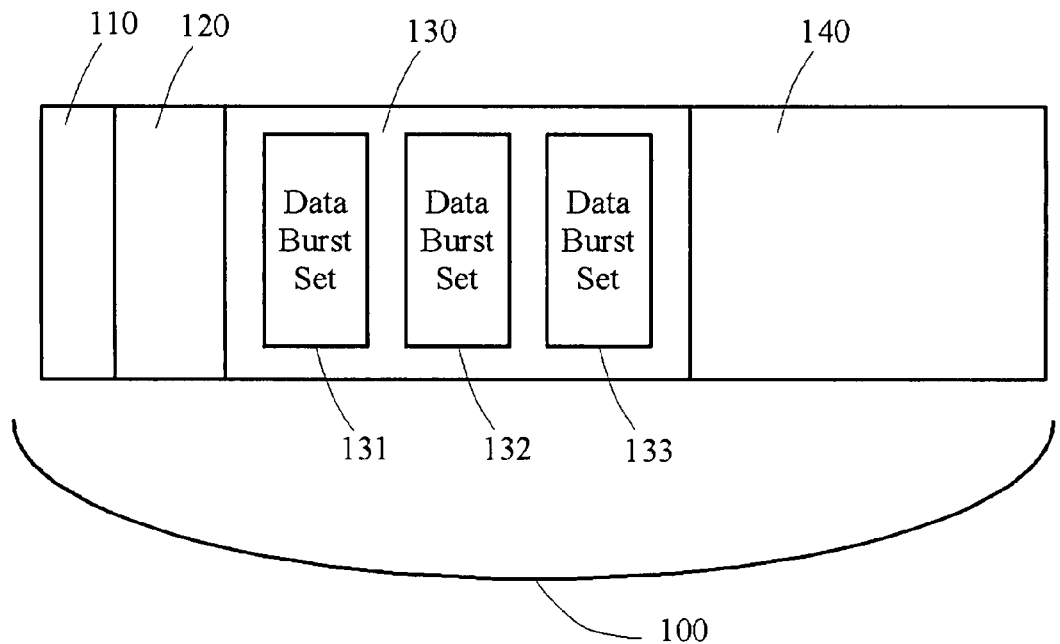
FIG. 1 is a schematic view of a conventional WiMAX MMR frame.
Figure 2:
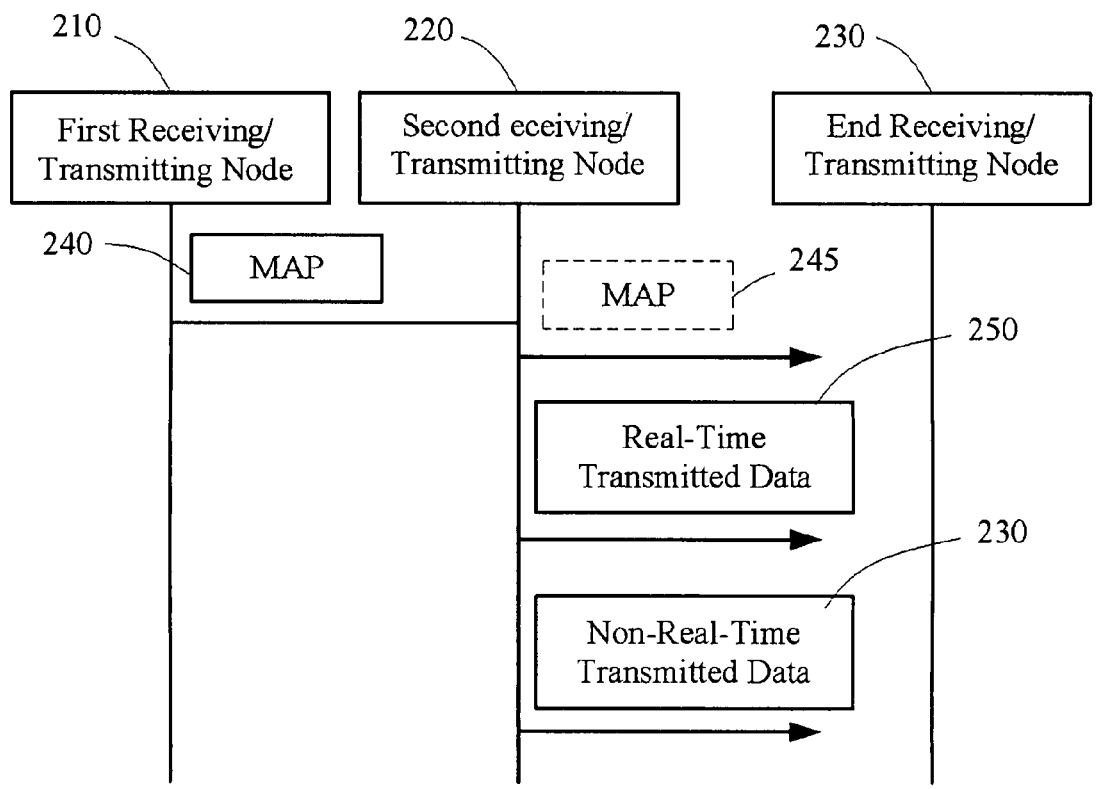
FIG. 2 is a schematic view of a wireless network scheduling control system according to an embodiment of the present invention.

An embodiment of the present invention discloses a wireless network scheduling control system applicable for Worldwide Interoperability for Microwave Access (WiMAX) Multi-hop Relay Network (WiMAX MMR network). FIG. 2 is a schematic view of a wireless network scheduling control system according to an embodiment of the present invention. Referring to FIG. 2, the system includes three roles, namely, a first receiving/transmitting node 210, a second receiving/transmitting node 220, and an end receiving/transmitting node 230, which respectively represent a base station (BS), a relay station (RS), and a subscriber station (SS) or a mobile station (MS). The data is transmitted between the first receiving/transmitting node 210 and the end receiving/transmitting node 230 via the second receiving/transmitting node 220 in a form of frames in an MAC protocol layer. A frame sent from the first receiving/transmitting node 210 is divided into several zones with different functions, including: zones for transmitting data from the first receiving/transmitting node 210 or the second receiving/transmitting node 220 to the end receiving/transmitting node 230 (referred as downlink access zones); zones for transmitting data from the end receiving/transmitting node 230 to the first receiving/transmitting node 210 or the second receiving/transmitting node 220 (referred as uplink access zones); zones for transmitting data from the first receiving/transmitting node 210 to the second receiving/transmitting node 220 (referred as downlink relay zones); and zones for transmitting data from the second receiving/transmitting node 220 to the first receiving/transmitting node 210 (referred as uplink relay zones). According to the WiMAX specification, the frame sent from the first receiving/transmitting node 210 includes an MAP 240, for planning when second receiving/transmitting node 220 is to receive/transmit the data (i.e., the start time) and how long it is allowed to receive/transmit the data (i.e., the transmission duration) within the frame transmission duration. The second receiving/transmitting node 220 decides by itself or is instructed to decide whether to follow the plan of the MAP 240 and relay the data to the end receiving/transmitting node 230 according to the MAP, or to independently generate an MAP 245 and send it out. If the second receiving/transmitting node 220 does not need to adjust the data transmission sequence received from the first receiving/transmitting node 210, the content recorded in the MAP 245 is the same as that in the MAP 240; otherwise, the content recorded in the MAP 245 is adjusted from that in the MAP 240.

FIG. 2 shows an embodiment of the present invention. At least one or more end receiving/transmitting nodes (not shown in FIG. 2) can be included in the WiMAX network architecture, and the MAP also plans a small part of the frame for data transmission for each of the end receiving/transmitting nodes. However, for the convenience of illustration, the environment of each subsequent example includes a first receiving/transmitting node, a second receiving/transmitting node, and an end receiving/transmitting node. Persons skilled in the art can derive a WiMAX MMR network architecture containing a first receiving/transmitting node, at least a second receiving/transmitting node, and a plurality of end receiving/transmitting nodes, which are not limited in the present invention.

Among the aforementioned zones of a frame, each of the zones further includes a plurality of data bursts, and each of the data bursts includes a pack of MAC Protocol Data Units (MAC PDUs). The header of each MAC PDU includes a connection ID (CID), and each CID is corresponding to a service class. According to the service class, the first receiving/transmitting node 210 or the second receiving/transmitting node 220 can receive and transmit the data after determining whether the data transmitted in the connection is suitable for being registered and reorganized. The criteria for such determination include, for example:

(1) Whether the type of the data transmitted by the end receiving/transmitting node is a non-real-time traffic.

(2) Whether the arrival interval between two continuous chunks of data is greater than a frame duration.

(3) The subscription policy applied to the end receiving/transmitting node.

(4) The Quality of Service (QoS) policy, such as delay, throughput, load balance, queue fullness, of the data transmitted applied to or subscribed by the end receiving/transmitting node.

The above determination criteria are only polices mentioned in an embodiment of the present invention. Persons skilled in the art can make modifications to such criteria, which are not limited herein.

Referring to FIG. 2 again, if the data transmitted in the connection is determined to be not suitable for delayed receiving or transmission by being registered and reorganized, which, for example, generally is a real-time transmitted data 250, the data does not need to be processed specially; on the contrary, if it is determined that the data transmitted in the connection can be received or transmitted after being registered and reorganized, which, for example, generally is a non-real-time transmitted data 260, the first receiving/transmitting node 210 or the second receiving/transmitting node 220 transmits a control message, e.g., MOB_SLP-RSP signal defined by IEEE 802.16, so as to notify the end receiving/transmitting node 230 to enter the sleeping mode. Then, the second receiving/transmitting node 220 registers a first data received from the first receiving/transmitting node 210, and does not relay a second data to the end receiving/transmitting node 230 temporarily. Similarly, when the end receiving/transmitting node 230 enters the sleeping mode, the uplink transmission of a third data is not performed temporarily, and the third data will not be transmitted until the end receiving/transmitting node 230 re-enters an active mode in a transmission period planned by the MAP.

Moreover, in some wider areas of WiMAX network environments, besides the second receiving/transmitting node 220 located between the first receiving/transmitting node 210 and the end receiving/transmitting node 230, a number of third receiving/transmitting nodes (not shown in FIG. 2) may exist between the first receiving/transmitting node 210 and the second receiving/transmitting node 220. The third receiving/transmitting node or nodes (not shown in FIG. 2) are also relay stations as the second receiving/transmitting node 220, and the first receiving/transmitting node 210 can receive data from or transmit data to the second receiving/transmitting node 220 via the third receiving/transmitting node or nodes by means of multi-hop transmission, so as to further expand the area of the WiMAX network. The third receiving/transmitting nodes can use directional antennae, or have line of sight (LOS) connection characteristic, so that the transmission modulation technology (e.g., 64-QAM modulation) with relatively high transmission efficiency can be employed to complete the data transmission with receiving/transmitting nodes rapidly. In such WiMAX network, the MAP 245 can be generated by the first receiving/transmitting node 210, the second receiving/transmitting node 220, or at least a third receiving/transmitting node (not shown in FIG. 2).

It should be noted that, as the third receiving/transmitting nodes are added, the registered data can be partially processed by the plurality of third receiving/transmitting nodes. Therefore, the second receiving/transmitting node 220 does not need to maintain a large quantity of registered data, which lowers the possibility of overflow for a buffer of the second receiving/transmitting node 220. The second receiving/transmitting node 220, or the third receiving/transmitting nodes (not shown in FIG. 2), and the end receiving/transmitting node 230 operated under the active mode will receive and transmit the data according to the plan of the MAP (240 or 250) upon receiving a frame. If the end receiving/transmitting node 230 operates in the sleeping mode that consumes far less power than the active mode, it does not receive or transmit data, which saves the power of the secondary battery.

In WiMAX network, a connection has to be established before data transmission can proceed. The end receiving/transmitting node 230 establishes connections with the first receiving/transmitting node 210 or the second receiving/transmitting node 220, in order to receive and transmit data. Each connection is associated with a set of Quality of Service (QoS) parameters or Service Class, according to which, whether the connection is a connection of real-time transmission can be determined, so as to determine the data transmitted or relayed by the second receiving/transmitting node 220 is real-time transmitted data or non-real-time transmitted data. When the second receiving/transmitting node 220 needs to transmit or relay the data to the end receiving/transmitting node 230, the second receiving/transmitting node 220 will determine whether the data is a real-time transmitted data. For example, when a connection is established between the first receiving/transmitting node 210 and the end receiving/transmitting node 230 to transmit files using File Transfer Protocol (FTP), the connection will be designated with relevant QoS parameters suitable for FTP. When data of a file transfer is relayed by the second receiving/transmitting node 220, the second receiving/transmitting node 220 determines the connection to be a non-real-time connection according to the QoS parameters, and the transmitted data over the connection is thus a non-real-time transmitted data.

In this embodiment, the first data is a data transmitted from the first receiving/transmitting node 210 to the second receiving/transmitting node 220, a fourth data is a data transmitted from the second receiving/transmitting node 220 to the first receiving/transmitting node 210; the second data is a data transmitted from the second receiving/transmitting node 220 to the end receiving/transmitting node 230; and the third data is a data transmitted from the end receiving/transmitting node 230 to the second receiving/transmitting node 220. If the second data transmitted from the first receiving/transmitting node 210 to the end receiving/transmitting node 230 via the second receiving/transmitting node 220 is a non-real-time transmitted data 260, the second receiving/transmitting node 220 can register the second data, and the original period for such second data within the frame will be changed for other uses, for example, it can be changed to transmit the data by the second receiving/transmitting node 220 to another end receiving/transmitting node (not shown in FIG. 2), or transmit the data by the second receiving/transmitting node 220 to the third receiving/transmitting node, and the change of the scheduling plan will be reflected in the MAP 245; if the period recorded in the MAP is to receive the third data from the end receiving/transmitting node 230 at the second receiving/transmitting node 220, the original period can be changed for other uses, for example, it is changed to receive data from another end receiving/transmitting node by the second receiving/transmitting node 220, or receive data from the third receiving/transmitting node by the second receiving/transmitting node. In addition, if the second data registered in the second receiving/transmitting node 220 exceeds or equal to a critical value, the receiving/transmitting node 210 or 220 awakes the end receiving/transmitting node 230 with a control message, such that the end receiving/transmitting node 230 enters the active mode and receives the second data registered in the second receiving/transmitting node, or transmits the third data registered in the end receiving/transmitting node 230 to the second receiving/transmitting node 220 according to the scheduling plan in the MAP 245. Herein, the critical value is expressed with the following equation:

$$\text{Critical Value} = \text{Data Capacity of DL-zone} \times \text{factor},$$
$$0 < \text{factor} \leq 1$$

The above process of determining the transmission timing according to the critical value is only an embodiment. For other situations, e.g., when the register space of the second receiving/transmitting node 220 is almost full, that is, Critical Value=Buffer of Second Receiving/Transmitting Node×factor, 0<factor≦1.

Then the second receiving/transmitting node 220 can also activate the above mechanism. Or, when the end receiving/transmitting node 230, actively sends the control message and requests to transmit some data due to some other reasons (e.g., some data must be transmitted instantly), the second receiving/transmitting node 220 can also activate the above mechanism to start data transmission.

Simply put, this embodiment discloses a wireless network scheduling control system in a WiMAX MMR network. The devices in the system, such as the first receiving/transmitting node, the second receiving/transmitting node, and the end receiving/transmitting node, all transmit data according to the MAP generated by the first receiving/transmitting node or the second receiving/transmitting node. The most special feature of this system lies in that, the second receiving/transmitting node will decide whether to register the data and reorganize the data in the transmitted frame structure according to attributes of the transmitted data (e.g., subscription policy or QoS characteristics such as real-time or non-real-time transmission). The method for implementing this system will be illustrated below in subsequent paragraphs.

Figure 3:
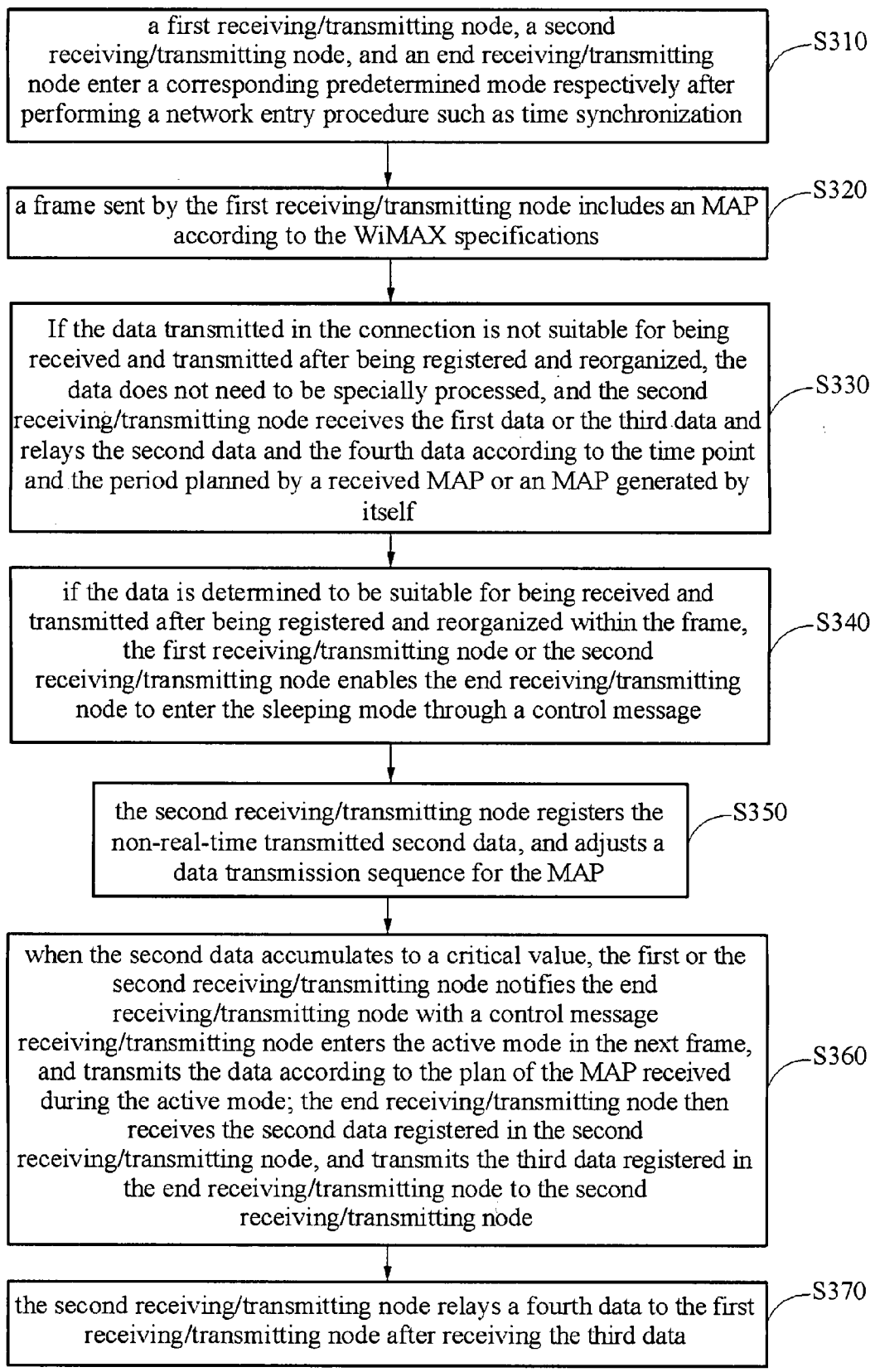
FIG. 3 is a flow chart of a wireless network scheduling control method according to another embodiment of the present invention.

Another embodiment of the present invention discloses a wireless network scheduling control method for a WiMAX MMR network. FIG. 3 is a flow chart of a wireless network scheduling control method according to another embodiment of the present invention. Firstly, after performing a network entry procedure such as time synchronization, a first receiving/transmitting node, a second receiving/transmitting node, and an end receiving/transmitting node enter a corresponding predetermined (operating) mode respectively (Step S310). The data is transmitted between the first receiving/transmitting node and the end receiving/transmitting node via the second receiving/transmitting node. Connections must be established before the data transmission, and each connection is corresponding to a service class. According to the service class, the first receiving/transmitting node or the second receiving/transmitting node can determine whether the data transmitted in the connection is suitable for being received or transmitted after being registered and reorganized. The determination criteria have already been described in the above paragraphs, which are not repeated herein.

The data is transmitted through frames in MAC. According to the WiMAX specifications, a frame sent by the first receiving/transmitting node includes an MAP (Step S320). If the data transmitted in the connection is not suitable for being received and transmitted after being registered and reorganized (for example, normally, real-time transmitted data), the data does not need to be specially processed, and the second receiving/transmitting node receives the first data or the third data and relays the second data and the fourth data according to the time point and the period planned by a received MAP or an MAP generated by itself (Step S330); otherwise, if the data is determined to be suitable for being received and transmitted after being registered and reorganized within the frame (for example, normally, non-real-time transmitted data), the first receiving/transmitting node or the second receiving/transmitting node enables the end receiving/transmitting node to enter the sleeping mode through a control message (e.g., a MOB_SLP-RSP signal defined by 802.16) (Step S340). Then, the second receiving/transmitting node registers the non-real-time transmitted second data, and adjusts a data transmission sequence for the MAP (Step S350). Finally, when the second data accumulates to a critical value, the first or the second receiving/transmitting node notifies the end receiving/transmitting node with a control message, such that the end receiving/transmitting node enters the active mode in the next frame (or after several frames), and transmits the data according to the plan of the MAP received during the active mode. The end receiving/transmitting node then receives the second data registered in the second receiving/transmitting node, and transmits the third data registered in the end receiving/transmitting node to the second receiving/transmitting node (Step S360), and after receiving the third data, the second receiving/transmitting node relays a fourth data to the first receiving/transmitting node (Step S370). Herein, the critical value can be calculated according to the following equation:

Critical Value=Data Capacity of DL-zone×factor, 0<factor≦1.

The above process for determining the transmission timing according to the critical value is only a possible embodiment. For other situations, e.g., when the buffer of the second receiving/transmitting node is almost full, that is, Critical Value<Buffer of Second Receiving/Transmitting Node×factor, 0<factor≦1.

Then the second receiving/transmitting node 220 will also activate the above mechanism. Or, when the end receiving/transmitting node 230 actively sends the control message and requests to transmit the data due to some other reasons (e.g., some data must be transmitted instantly), the second receiving/transmitting node 220 can also activate the above mechanism to start to transmit the data.

As described above, in Step S350, the process of adjusting the data transmission sequence for the MAP includes the following steps. The scheduled period that the second receiving/transmitting node transmits the second data to the end receiving/transmitting node is changed to transmit the data to one or more third receiving/transmitting nodes, or transmit the data to at least one end receiving/transmitting node participating in the real-time transmission. The main objective of such a practice lies in preventing the waste of bandwidth. As the second data satisfies the register and reorganize condition, the original period that the second receiving/transmitting node transmits the second data planned by the MAP will be idle as the data had been registered. In order to avoid the waste of the bandwidth, this period can provide other functions, for example, transmitting other data to other third receiving/transmitting nodes, or performing data transmission (transmitting/receiving the second data or the third data) with one or more other end receiving/transmitting nodes that do not satisfy the register and reorganize condition. The power saving performance of the present invention will be briefly described in the next paragraph, so as to prove that the present invention can save electrical power consumed by the receiving nodes while maintaining the same transmission efficiency.

The power saving performance of the present invention will be described through examples. In the WiMAX network, if the first receiving/transmitting node has C bits of data that needs to be relayed to an end receiving/transmitting node via the second receiving/transmitting node, at a transmission rate of B bits per second, then, it is derived that the data transmission can be completed in C/B seconds in case of continuous transmission. Without loss of generality, it is assumed that a data burst of the end receiving/transmitting node is a non-real-time data, and each burst has a duration of t seconds, and then, C bits of data will be completed through (C/B)/t bursts.

Assuming zones for receiving data from and transmitting data to the end receiving/transmitting node in a frame has D bursts, and the data relevant to the end receiving/transmitting node in the D bursts have d bursts, the transmission of all of the data needs $F=((C/B)/t)/d$ frames. The difference between the situations of using and without using the present invention is listed as follows:

(1) When the present invention is not used, the end receiving/transmitting node must remain in the active mode until the data transmission is completed, and the times for the end receiving/transmitting node to enter the sleeping mode in F frames are 0.

(2) When the present invention is used, in case that the data transmission is completed within F frames, and the possibility that each data is registered is 100% (i.e., the data in the D bursts are all transmitted to the end receiving/transmitting node, and they are all non-real-time transmitted data that need to be registered), the times for the end receiving/transmitting node to enter the sleeping mode in the F frames is $F-((C/B)/t)/D$.

(3) If the $\phi D$ bursts among the D bursts are transmitted to the end receiving/transmitting node each time, the times for the end receiving/transmitting node to enter the sleeping mode in the F frames is $F-((C/B)/t)/\phi D$.

It is derived from the above description that:

The power saving rate of (2) is $(F-((C/B)/t)/D)/F=(1-d/D)\times 100\%$

The power saving rate of (3) is $(F-((C/B)/t)/D)/F=(1-d/\phi D)\times 100\%$

Simply put, the saving rate of the present invention depends on the percentage between the data received or transmitted by the end receiving/transmitting node in each frame and the number of bursts in one frame, which can also be regarded as how much time in the awake time of the end receiving/transmitting node is taken to transmit or receive the data. Certainly, in case that all of the awake time of the end receiving/transmitting node is effectively utilized (to transmit or receive data), the end receiving/transmitting node will have the maximum power saving efficiency.

To sum up, the present invention utilizes the technology of registering data and technology of data reorganization in the transmitted frame structure. The data will be sent to the end receiving/transmitting node after being accumulated to a certain amount by the second receiving/transmitting node. During the period of accumulating the amount of data, the end receiving/transmitting node can enter the sleeping mode when it does not participate in the receiving and transmission of data, so as to save the power consumption, and to further prolong the operation time of the end receiving/transmitting node. In addition, as the added second receiving/transmitting node or third receiving/transmitting node is close to the receiving node, it is possible that the end receiving/transmitting node transmits and receives the data rapidly with a high transmission and modulation technology, so as to enter the sleeping mode earlier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wireless network scheduling control system, applicable for a wireless network in which data transmission and scheduling control are separated when performing wireless transmission between nodes, at least comprising:

a first receiving/transmitting node, for generating an MAP after synchronization, and being responsible for transmitting a first data;

a second receiving/transmitting node, for receiving the MAP after synchronization, selectively following the MAP or independently generating the MAP, and being responsible for receiving the first data and transmitting a second data; and at least one end receiving/transmitting node, for receiving the MAP after synchronization, receiving the second data or transmitting a third data to the second receiving/transmitting node, and relaying a fourth data to the first receiving/transmitting node via the second receiving/transmitting node;

wherein the first receiving/transmitting node or the second receiving/transmitting node selectively transmits a control message to the end receiving/transmitting nodes, such that the end receiving/transmitting nodes enter a sleeping mode or an active mode;

wherein when data relayed by the second receiving/transmitting node is real-time transmitted data, the real-time transmitted data is relayed according to the MAP;

wherein when data relayed by the second receiving/transmitting node is non-real-time transmitted data, the control message is transmitted directly or indirectly, such that the end receiving/transmitting nodes enter the sleeping mode, and then the second receiving/transmitting node registers the non-real-time transmitted data and adjusts a data transmission sequence for the MAP, and when an amount of the non-real-time transmitted data accumulates to exceed or equal to a critical value, the second receiving/transmitting node notifies the end receiving/transmitting node to enter the active mode through the control message so as to receive the registered second data.

2. The wireless network scheduling control system as claimed in claim 1, comprising a Worldwide Interoperability for Microwave Access Mobile Multi-hop Relay (WiMAX MMR) network.

3. The wireless network scheduling control system as claimed in claim 1, wherein the control message is a real-time transmitted data, for notifying the end receiving/transmitting nodes to enter the active mode or enter the sleeping mode.

4. The wireless network scheduling control system as claimed in claim 1, wherein the first receiving/transmitting node is a base station, the second receiving/transmitting node is a relay station, and each of the end receiving/transmitting nodes is a subscriber station or a mobile station, and default modes corresponding to the first receiving/transmitting node, the second receiving/transmitting node, and the end receiving/transmitting nodes are the active mode.

5. The wireless network scheduling control system as claimed in claim 1, further comprising at least a third receiving/transmitting node, wherein the third receiving/transmitting nodes are positioned between the first receiving/transmitting node and the second receiving/transmitting node, such that the first receiving/transmitting node transmits the MAP and the transmitted data to the second receiving/transmitting node via the third receiving/transmitting nodes by means of multi-hop relay (MMR), wherein the third receiving/transmitting nodes employ high transmission efficiency modulation.

6. The wireless network scheduling control system as claimed in claim 5, wherein adjusting the data transmission sequence of the MAP includes:

changing a scheduled period that the second receiving/transmitting node transmits the second data to the end receiving/transmitting nodes to performing data transmission with the third receiving/transmitting nodes or with the end receiving/transmitting nodes that relay real-time data;

changing a scheduled period that the second receiving/transmitting node receives the third data from the end receiving/transmitting nodes to performing data transmission with the third receiving/transmitting nodes or with the end receiving/transmitting nodes that relay real-time data.

7. The wireless network scheduling control system as claimed in claim 1, wherein the end receiving/transmitting nodes register the third data when entering the sleeping mode, and transmit the third data according to a period planned by the MAP when entering the active mode.

8. The wireless network scheduling control system as claimed in claim 1, wherein data is determined to be non-real-time transmitted data if a type of the data transmitted by the end receiving/transmitting nodes is a non-real-time traffic, if an interval between the receiving and transmitting of the data by the end receiving/transmitting nodes is greater than a frame, according to a type of subscription policy that the end receiving/transmitting nodes have applied for, or according to a Quality of Service of data transmission for the end receiving/transmitting nodes.

9. The wireless network scheduling control system as claimed in claim 1, wherein the critical value is obtained according to the following equation:

Critical Value=Data Capacity of downlink zone (DL-zone)×Factor, 0<Factor≦1, or

Critical Value=Buffer of Second Receiving/Transmitting Node×Factor, 0<Factor≦1.

10. A wireless network scheduling control method, applicable for a wireless network in which data transmission and scheduling control are separated when performing wireless transmission between nodes, at least comprising:

a first receiving/transmitting node, a second receiving/transmitting node, and at least one end receiving/transmitting node entering a default mode after synchronization;

the first receiving/transmitting node or the second receiving/transmitting node generating an MAP;

when data relayed by the second receiving/transmitting node is real-time transmitted data, the second receiving/transmitting node receiving a first data transmitted by the first receiving/transmitting node and relaying a second data to the end receiving/transmitting nodes according to the MAP;

when data relayed by the second receiving/transmitting node is non-real-time transmitted data, the first receiving/transmitting node or the second receiving/transmitting node transmitting a control instruction, so as to instruct the end receiving/transmitting nodes to enter a sleeping mode;

the second receiving/transmitting node registering the non-real-time transmitted data, and adjusting a data transmission sequence for the MAP;

when an amount of the non-real-time transmitted data accumulates to exceed or equal to a critical value, the second receiving/transmitting node directly or indirectly notifying the end receiving/transmitting nodes to enter an active mode with a control message, so as to receive the registered non-real-time transmitted data or transmit a third data; and after receiving the third data, the second receiving/transmitting node relaying a fourth data to the first receiving/transmitting node.

11. The wireless network scheduling control system as claimed in claim 10, wherein the first receiving/transmitting node is a base station, the second receiving/transmitting node is a relay station, and each of the end receiving/transmitting nodes is a subscriber station or a mobile station, and default modes corresponding to the first receiving/transmitting node, the second receiving/transmitting node, and the end receiving/transmitting nodes are the active mode.

12. The wireless network scheduling control method as claimed in claim 10, further comprising at least a third receiving/transmitting node, wherein the third receiving/transmitting nodes are a plurality of relay stations and located between the first receiving/transmitting node and the second receiving/transmitting node, such that the first receiving/transmitting node transmits the MAP or the transmitted data to the second receiving/transmitting node via the third receiving/transmitting node by means of multi-hop relay (MMR), wherein the third receiving/transmitting nodes employ high transmission efficiency modulation.

13. The wireless network scheduling control method as claimed in claim 12, wherein adjusting the data transmission sequence for the MAP includes:

changing a scheduled period that the second receiving/transmitting node transmits the second data to the end receiving/transmitting nodes to performing data transmission with the third receiving/transmitting nodes or with the end receiving/transmitting nodes that relay real-time data; and changing a scheduled period that the second receiving/transmitting node receives the third data from the end receiving/transmitting nodes to performing data transmission with the third receiving/transmitting nodes or with the end receiving/transmitting nodes that relay real-time data.

14. The wireless network scheduling control method as claimed in claim 10, further comprising registering the third data by the end receiving/transmitting nodes when the end receiving/transmitting nodes enter the sleeping mode, and transmitting the third data according to a period planned by the MAP when entering the active mode.

15. The wireless network scheduling control method as claimed in claim 10, wherein the control message is a real-time transmitted data, for notifying the end receiving/transmitting nodes to enter the active mode or enter the sleeping mode.

16. The wireless network scheduling control method as claimed in claim 10, wherein the critical value is obtained according to the following equation:

Critical Value=Data Capacity of DL-zone×Factor, 0<Factor≦1, or

Critical Value=Buffer of Second Receiving/Transmitting Node×Factor, 0<Factor≦1.

17. The wireless network scheduling control method as claimed in claim 10, further comprising when the second data registered in the second receiving/transmitting node exceeds or equals to the critical value, the second receiving/transmitting node directly or indirectly transmitting the control message, so as to notify the end receiving/transmitting nodes to enter the active mode to receive the second data or transmit the third data.

18. The wireless network scheduling control method as claimed in claim 10, wherein data is determined to be non-real-time transmitted data if a type of the data transmitted by the end receiving/transmitting nodes is a non-real-time traffic, if an interval between the receiving and transmitting of the data by the end receiving/transmitting nodes is greater than a frame, according to a type of subscription policy that the end receiving/transmitting node has applied for, or according to a Quality of Service of data transmission for the end receiving/transmitting nodes.

19. A non-transitory computer readable recording medium, having stored thereon computer program code executed in a wireless network, in which data transmission and scheduling control are separated when performing wireless transmission between nodes, wherein the computer program code comprises instructions to perform the following steps:

a first receiving/transmitting node, a second receiving/transmitting node, and at least one end receiving/transmitting node entering a default mode after synchronization;

the first receiving/transmitting node or the second receiving/transmitting node generating an MAP;

when data relayed by the second receiving/transmitting node is real-time transmitted data, the second receiving/transmitting node receiving a first data transmitted by the first receiving/transmitting node and relaying a second data to the end receiving/transmitting nodes according to the MAP;

when data relayed by the second receiving/transmitting node is non-real-time transmitted data, the first receiving/transmitting node or the second receiving/transmitting node transmitting a control instruction, so as to instruct the end receiving/transmitting nodes to enter a sleeping mode;

the second receiving/transmitting node registering the non-real-time transmitted data, and adjusting a data transmission sequence for the MAP;

when an amount of the non-real-time transmitted data accumulates to exceed or equal to a critical value, the second receiving/transmitting node directly or indirectly notifying the end receiving/transmitting nodes to enter an active mode with a control message, so as to receive the registered non-real-time transmitted data or transmit a third data; and after receiving the third data, the second receiving/transmitting node relaying a fourth data to the first receiving/transmitting node.

20. The non-transitory computer readable recording medium as claimed in claim 19, wherein the first receiving/transmitting node is a base station, the second receiving/transmitting node is a relay station, and each of the end receiving/transmitting nodes is a subscriber station or a mobile station, and default modes corresponding to the first receiving/transmitting node, the second receiving/transmitting node, and the end receiving/transmitting nodes are the active mode.

21. The non-transitory computer readable recording medium as claimed in claim 19, the wireless network further comprising at least a third receiving/transmitting node, wherein the third receiving/transmitting nodes are a plurality of relay stations, and located between the first receiving/transmitting node and the second receiving/transmitting node, such that the first receiving/transmitting node transmits the MAP or the transmitted data to the second receiving/transmitting node via the third receiving/transmitting node by means of multi-hop relay (MMR), wherein the third receiving/transmitting nodes employ high transmission efficiency modulation.

22. The non-transitory computer readable recording medium as claimed in claim 21, wherein adjusting the data transmission sequence for the MAP includes:

changing a scheduled period that the second receiving/transmitting node transmits the second data to the end receiving/transmitting nodes to performing data transmission with the third receiving/transmitting nodes or with the end receiving/transmitting nodes that relay real-time data; and changing a scheduled period that the second receiving/transmitting node receives the third data from the end receiving/transmitting nodes to performing data transmission with the third receiving/transmitting nodes or with the end receiving/transmitting nodes that relay real-time data.

23. The non-transitory computer readable recording medium as claimed in claim 19, the computer program code further comprising instructions to perform steps of:

registering the third data by the end receiving/transmitting nodes when the end receiving/transmitting nodes enter the sleeping mode, and transmitting the third data according to a period planned by the MAP when entering the active mode.

24. The non-transitory computer readable recording medium as claimed in claim 19, wherein the control message is a real-time transmitted data, to notify the end receiving/transmitting nodes to enter the active mode or enter the sleeping mode.

25. The non-transitory computer readable recording medium as claimed in claim 19, wherein the critical value is obtained according to the following equation:

Critical Value=Data Capacity of DL-zone×Factor, 0<Factor≦1, or

Critical Value=Buffer of Second Receiving/Transmitting Node×Factor, 0<Factor≦1.

26. The non-transitory computer readable recording medium as claimed in claim 19, the computer program code further comprising instructions to perform a step of, when the second data registered in the second receiving/transmitting node exceeds or equals to the critical value, the second receiving/transmitting node transmitting the control message, so as to notify the end receiving/transmitting nodes to enter the active mode to receive the second data or transmit the third data.

27. The non-transitory computer readable recording medium as claimed in claim 19, wherein data is determined to be non-real-time transmitted data if a type of the data transmitted by the end receiving/transmitting nodes is a non-real-time traffic, if an interval between the receiving and transmitting of the data by the end receiving/transmitting nodes is greater than a frame, according to a type of subscription policy that the end receiving/transmitting node has applied for, or according to a Quality of Service of data transmission for the end receiving/transmitting nodes.

* * * * *